United States Patent [19]

Muncke

[11] Patent Number: 4,795,017

[45] Date of Patent: Jan. 3, 1989

[54] HYDRAULIC CIRCUIT FOR THE CONTROL OF FORWARD AND REVERSE SHIFT CLUTCHES

[75] Inventor: Ludwig Muncke, Lohr/Main, Fed. Rep. of Germany

[73] Assignee: Mannesmann Rexroth GmbH, Lohr/Main, Fed. Rep. of Germany

[21] Appl. No.: 905,499

[22] Filed: Sep. 10, 1986

[30] Foreign Application Priority Data

Sep. 11, 1985 [DE] Fed. Rep. of Germany ....... 3532473

[51] Int. Cl.$^4$ .................. B60K 20/14; F16D 25/11
[52] U.S. Cl. ........................ 192/3.57; 192/87.19; 192/109 F
[58] Field of Search .......... 192/3.51, 3.57, 87.13, 192/87.14, 87.18, 87.19, 109 F

[56] References Cited

U.S. PATENT DOCUMENTS

| | | | |
|---|---|---|---|
| 3,990,553 | 11/1976 | Holzinger | 192/3.57 |
| 4,086,994 | 5/1978 | Hirosawa et al. | 192/109 F |
| 4,293,059 | 10/1981 | Lucas | 192/3.57 |
| 4,452,101 | 6/1984 | Fujioka | 192/87.19 X |
| 4,492,251 | 1/1985 | Blake | 192/87.14 X |
| 4,598,545 | 7/1986 | Harada | 192/3.51 X |

Primary Examiner—Rodney H. Bonck
Assistant Examiner—Richard M. Lorence
Attorney, Agent, or Firm—Oblon, Fisher, Spivak, McClelland & Maier

[57] ABSTRACT

A hydraulic load power train control for reversible shifting with a pressure control device for the controlled build-up of a shift clutch pressure, a foot clutch valve for arbitrary control of the shift clutches, and a manually operable shift valve for shifting of the reversible power train. The foot clutch valve is connected parallel to the pressure control device. The pressure control device is formed by a changeover valve indirectly reversible by the shift valve by which the pressure controlled in the supply pressure line can be fed to two shift pressure lines which are connected to a valve device. At the same time, the valve device is so controlled by the foot clutch valve that the effective shift clutch pressure can be controlled without influencing the position of the changeover valve as a function of the actuation of the foot clutch. The hydraulic load power train control, on the one hand, makes possible, in the case of engaging or reversing of the shift clutches, a smooth transition from one gear to the other and, at the same time, a delay-free start in the shifting by actuation of the foot clutch.

13 Claims, 1 Drawing Sheet

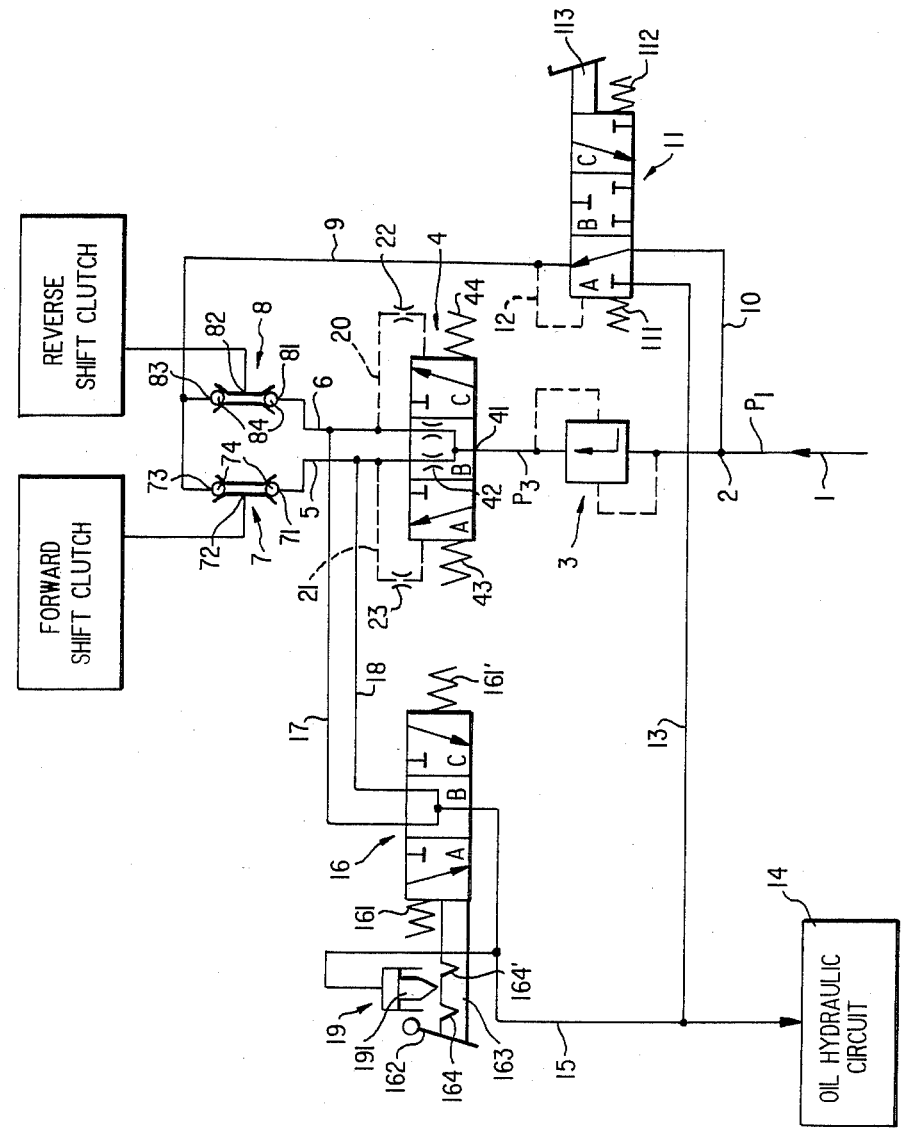

HYDRAULIC CIRCUIT FOR THE CONTROL OF FORWARD AND REVERSE SHIFT CLUTCHES

FIELD OF THE INVENTION

The invention relates to a hydraulic load power train control for the reversible shifting of the power train of a vehicle, particularly of a farm tractor. The hydraulic load power train includes a pressure control device for the controlled build-up of a shift clutch pressure, a foot clutch valve for control of the shift clutches, and a manually operable shift valve for shifting of the reversible power train.

BACKGROUND OF THE INVENTION

A load power train control of the general type identified above is already in use. The prior art pressure control device is formed by a pressure modulator that is connected in series to a clutch valve, a safety valve, and a manually operated changeover switch for control either of the forward or reverse shift clutch. In the changeover of the shift clutches from forward to reverse and/or during the first time control of the respective shift clutches after starting the vehicle engine, the pressure modulator causes the clutch shift pressure to be built up slowly according to a transition function before the clutch is completely engaged with full control pressure. This causes a smooth start of the vehicle, without the foot clutch having to be actuated. The safety valve functions so that, after cutting off of the engine and after renewed starting, at first neither of the shift clutches is engaged. This ensures that the vehicle is kept from moving unintentionally after starting the engine.

Since, in addition to the automatic starting process, the possibility must also be offered of shifting the vehicle by means of the foot clutch, the clutch valve is provided. By the incorporation, according to the prior art, of the clutch valve in the circuit comprising the pressure modulator, the safety valve, and the shift valve, when the clutch valve is used, the function of the pressure modulator also has an effect on the closing of the reversible shift clutches, and engagement of the shift is delayed when the clutch pedal is stepped on. As a result, a sensitive and measured engagement and thus an exact shifting of the vehicle is made more difficult for the operator.

OBJECTS OF THE INVENTION

A principal object of the invention is to provide a hydraulic load power train control of the type mentioned at the outset with which, by a simple design, a smooth engagement of the changed shift clutch for the automatic starting process is obtained.

Another object of the invention is to provide a hydraulic load pressure train control of the type mentioned at the outset in which, by actuation of the foot clutch, an exact and delay-free start can be obtained.

SUMMARY OF THE INVENTION

By the parallel connection according to the invention of the foot clutch valve and the pressure control, which is controlled indirectly by the shift valve, the conditions are created for the pressure control device no longer to function effectively when the foot clutch valve is actuated, so that, in this operating condition, the effective shift clutch pressure can be controlled exclusively and directly by the position of the foot clutch valve.

The controllability according to the invention of the effective shift clutch pressure without influencing the position of the changeover valve as a function of the actuation of the foot clutch can be realized with an especially simple device engineering measure of the type disclosed hereinafter. In particular, the control of the inverted shuttle valves sees to it that the shift clutch pressure, supplied by the changeover valve, is provided to respective shift clutches as long as the control pressure coming from the foot clutch valve is greater than the effective shift clutch pressure. Thus, if the foot clutch valve is so moved that the control pressure controlled by it constantly drops, for example, with the movement of the clutch valve, this dropping pressure from the time at which it falls directly below the effective shift clutch pressure can be provided directly to the shift clutch that is engaged. As a result, the directness between clutch actuation and influencing of the shift clutch pressure necessary for a specific shifting is provided.

The presently preferred configuration of the changeover valve provides for a compulsory and simultaneously controlled transition for the two shift clutches—i.e., rise and fall of the shift pressure applied to the shift clutches. This results in the additional advantage that the control transition takes place independently of how fast the manually operable shift valve is actuated.

If throttles are incorporated in the feed back control lines of the chanqeover valve, the pressure transition behavior can be optimally adjusted. Preferably in this case an adjustability of the throttle cross section to the prestress devices and control edges and the changeover valve is provided.

According to a particularly advantageous feature of the invention, it is possible to perform the above-described safety function at a very small device engineering cost. A further simplification is obtained by using the effect that, when the engine is cut off, the pressure in the hydraulic pressure circuit of the tractor collapses.

If the discharge of the individual control lines of the load power train control takes place in an oil circuit of the power train, the additional advantage results that the pressure in the individual control lines can be varied between exactly defined limits. As a result, the response behavior of the load power train control remains independent of what load the hydraulic system of the vehicle is exposed to, so that an unvarying control characteristic is provided.

BRIEF DESCRIPTION OF THE DRAWING

An embodiment of the invention is explained below in greater detail with the aid of the single drawing, which is a block diagram of the hydraulic load power train control.

DETAILED DESCRIPTION CF THE PRESENTLY PREFERRED EMBODIMENT

A hydraulic steering gear control for the reversible shifting of a power train (not shown in the figure, but, for example, of a farm tractor) includes a supply pressure line 1 in which, for example, a supply pressure $p_l$ of 15 bars prevails. Downstream from a branching point 2 of the supply pressure line 1 is provided a pressure reducing valve 3, by which the supply pressure $p_l$ is reduced by a constant value of, for example, 3 bars, producing a reduced supply pressure $p_3$. The reduced supply pressure $p_3$ is provided at an intake connection 41 of a changeover valve 4. In its neutral position shown in the figure, the changeover valve 4 provides a throttle supply pressure produced by, for example, throttles 42 formed by control edges to two shift pressure lines 5 and 6.

The shift pressure line 5 runs to a control connection 71 of an inverted shuttle valve 7, and the shift pressure line 6 runs to a control connection 81 of an inverted shuttle valve 8. The inverted shuttle valve 7 has an output connection 72 connected to a forward shift clutch, and the inverted shuttle valve 8 has an output connection 82 connected to a reverse shift clutch. The inverted shuttle valve 7 has a second control connection 73, and the inverted shuttle valve 8 has a second control connection 83. The pressure of a control line 9 is applied to both the second control connection 73 and the second control connection 83.

In the neutral operating position of the load power train control shown in the figure, the control line 9 is supplied by a branch line 10 that branches from the supply pressure line 1 at the branching point 2. The pressure in the control line 9 thus is a function of the position of a clutch valve (preferably a foot clutch valve) 11. The clutch valve 11 is designed as a three-way valve with three shift positions A, B, and C. The piston slide of the clutch valve 11 is centered by spring devices 111 and 112 in the shift position B. A reverse coupling line 12 branching from the control line 9 downstream of the clutch valve 11 acts on the piston slide of the clutch valve 11 in such a way that the piston slide is moved in the direction of the shift position A by the pressure in the reverse coupling line 12. The piston slide of the clutch valve 11 can be moved against the pressure prevailing in the reverse coupling line 12 by a positioning device 113 (which, for example, can be formed by a clutch pedal) past the shift position B into the shift C. In the shift position C of the clutch valve 11, the branch line 10 is closed, and, at the same time, the control line 9 is connected to a pressure discharge line 13 which is connected to an oil hydraulic circuit 14. The oil hydraulic circuit 14 is operated, for example, at a pressure of 2 bars.

The valve device formed by the inverted shuttle valves 7 and 8 works so that the lower pressure applied to the control connection 71 and 73 or 81 and 83, respectively, is provided to the corresponding output connection 72 or 82. For this purpose, the shuttle valves 7 and 8 are so designed that non return balls 74 and 84 shown in the figure are mechanically connected to one another, so that the higher applied control pressure closes the associated valve seat and, at the same time, opens the other control connection, on which a lower pressure prevails.

In the neutral operating position of the load power train control shown in the figure, a maximum operating pressure of 2 bars, which is imposed by the pressure of the oil hydraulic circuit 14, is present on both the output connection 72 and the output connection 82. The oil hydraulic circuit 14 is connected to a further discharge line 15 which in turn is connected to a manually operable shift valve 16. The manually operable shift valve 16 is connected in the illustrated position of this valve to two shift control lines 17 and 18. The shift control lines 17, 18 in turn are connected to the two shift pressure lines 5 and 6, respectively. Thus, independently of the level of built up supply pressure $p_l$, the lower pressure in the shift pressure lines 5 and 6, in the shift position of the manually operable shift valve 16 shown in the figure, prevails on the inverted shuttle valves 7 and 8. Accordingly, neither of the shift clutches is actuated, since the pressure level of the oil hydraulic circuit 14 is not sufficient for this.

The manually operable shift valve 16 is also designed as a three-way valve. It is centered by spring devices 161', 161 in the shift center position B that is shown. By a manually operable positioning device 162 which acts on a slide rod 163, the piston slide of the manually operable shift valve 16 can be selectively moved into shift positions A and C, in which either only shift control line 17 or only shift control line 18 is discharged. So that the manually operated shift valve 16 can be locked or secured in either shift position (i.e, either shift position A, provided for forward shifting, or shift position C, provided for reverse shifting), a safety notch 19 is provided which has a stop piston 191 acted on by the pressure in the discharge line 15. The stop piston 191 can be brought to engage either of two notched recesses 164, 164' in the slide rod 163. In the neutral shift position of the load power train control shown in the figure, the stop piston 191 is between the notched recesses 164. That is, in the neutral shift position, the position of the stop piston 191 is independent of whether or not pressure is built up in the oil hydraulic circuit 14 (e.g., a lubrication circuit).

The changeover valve 4 has the object, in reversing the clutches (i.e., in actuation of the manually operable shift valve 16) to see to it that the pressure in the shift clutch to be actuated is built up smoothly. For this purpose, the changeover valve 4 is designed as a three-way valve with three shift positions A, B, and C, the piston slide being centered in the shift position B by centering springs 43 and 44. The two front sides of the piston slide of the changeover valve 4 are each acted on by a feed back control line 20 or 21, respectively, transmitting the pressures prevailing in shift pressure lines 6 or 5. To influence the movement process of the piston slide of the changeover valve 4, there are provided in the feed back control lines 20 and 21 throttles 22 and 23 which are adjusted to the action of the centering springs 43 and 44 as well as to the overlap of the control edges of the piston slide of the changeover valve 4. This guarantees a slow pressure build-up, which later can proceed increasingly rapidly, either in the shift pressure line 5 or in the shift pressure line 6.

The shown hydraulic load power train control functions as follows.

If the vehicle engine, for example of a farm tractor, in which the load power train to be shifted s installed is turned off, so that the load pump for providing supply $p_l$ is not in operation, the components of the load power train control described above take the position shown in the figure. The forward shift clutch and the reverse shift clutch are without pressure, since no pressure is built up either in the oil hydraulic circuit 14 or in the supply pressure line 1 and thus in the control line 9.

If the vehicle engine is turned on and the pump works, the oil circuit pressure is built up in the shift pressure lines 5 and 6, for example to a level of 2 bars, which is provided to both shift clutches by the inverted shuttle valves 7 and 8. This oil circuit pressure is so small that it cannot actuate the shift clutches. The stop piston 191 of the safety notch 19 is acted on only with the pressure in the discharge line 15. However, the stop piston 191 cannot sink into one of the notch recesses 164, 164' since the slide rod 163 of the manually operable shift valve 16 is centered in the position B by the spring devices 161, 161'.

If the vehicle power train is to be brought into the forward shift position, the manually operable positioning device 162 is actuated so that the shift valve 16 takes the shift position A. The shift control line 18 is closed in this shift position, while the shift control line 17 continues to be discharged into the oil hydraulic circuit 14. Therefore there is gradually built up in the shift control line 18 a pressure which is provided by the feed back control line 21 and the throttle 23 to the piston slide of the changeover valve 4. This pressure build-up causes a gradual movement of the piston slide of the changeover valve 4 to the shift position A, in which throttle supply pressure p3 is provided to the shift pressure line 5 and the stop piston 191 engages the notched recess 16. Since the pressure, in interconnection position A of the clutch valve 11, applied to the second control connection 73 of the inverted shuttle valve 7 is greater than the pressure in the shift pressure line 5, the pressure in the shift pressure line 5 during the entire pressure build-up phase prevails on the output connection 72 of the inverted shuttle valve 7 so that the effective shift clutch pressure gradually rises from 2 bars to the throttle supply pressure p3. As a result, the vehicle can be started smoothly, without the foot clutch 11 having to be actuated for this purpose. The transition behavior of the pressure build-up can be set by adjustment of the throttle 23 to the control edges and the centering springs 43, 44 of the changeover valve 4.

During the movement of the slide of the changeover valve 4, the conditions on the inverted shuttle valve 8 remain unchanged, since as before the pressure in the shift control line 17 prevails on the output connection 82.

If the vehicle power train is to be reversed from the forward shifting position to the reverse shifting position, the manually operable positioning device 162 is moved in the opposite direction, bringing the piston slide of the shift valve 16 through the position B to the position C and bringing the piston 191 from the notched recess 164 to the notched recess 164'. That is, in the shift position C, the stop 191 engages the other notched recess 164' of the slide rod 163. By movement of the shift valve 16, the shift control line 18 is discharged into the discharge line 15, so that the pressure in the shift pressure line 5 is reduced in a controlled way. At the same time, the pressure discharge of the shift control line 17 is interrupted so that the same pressure build-up takes place in the shift pressure line 6 that was described above for the shift pressure line 5. Then, by the feed back control line 20 and the throttle 22, the piston slide of the changeover valve 4 is gradually and, toward the end of the reverse movement, progressively moved into the shift position C, in which an interconnection of the throttled supply pressure p3 to the shift pressure line 6 takes place. As described above in reference to the inverted shuttle valve 7, also in the case of the inverted shuttle valve 8 the increasing pressure in the shift pressure line 6 constantly prevails on the output connection 82. Accordingly, the reverse shift clutch is increasingly acted on, so that a smooth transition in reversing the clutches takes place.

If the vehicle is to be shifted in the case of forward or reverse shifted clutch, the clutch valve 11 is actuated (i.e., moved into positioning C) by the positioning device 113. The piston slide of the clutch valve 11 then causes the control line 9 to be increasingly discharged by the pressure discharge line 13, so that the pressure in the control line 9 as a function of the actuation of the positioning device 113 can be deliberately controlled to values below the pressure which by the shift pressure lines 5 and 6 is applied on the corresponding inverted shuttle valve—i.e., on the inverted shuttle valve allocated to the actuated shift clutch. But as soon as the pressure in the control line 9 falls below the pressure of the shift pressure lines 5 or 6 effective at that time on the active shift clutch, this reduced pressure prevails on the engaged shift clutch, so that the shift pressure can be directly influenced by play with the positioning device 113, without the position of the changeover valve 4 being affected thereby. On the contrary, the changeover valve 4 is completely uncoupled when the positioning device 113 is actuated, so that actuation of the clutch valve 11 on the forward or reverse shift clutch can prevail free of delay.

If the vehicle engine is cut off, the pressure in the supply pressure line 1 and in the oil hydraulic circuit 14 drops to zero. As a result, the parts shown in the figure take the positions shown. In this case the function of the spring devices 161, 161 is particularly important. After a pressure drop in the discharge line 15, the spring devices 161, 161 cause the shift valve 16 to move automatically into the neutral position B by camming the stop piston 191 out of whichever notched recess 164, 164' it is located in. This is made possible because the pressure of the safety notch 19 acting on the stop piston 191 is also reduced so that the force of the spring devices 161, 161' is sufficient to disengage the stop piston 191 from the notched recesses 164, 164' in the slide rod 163. In this way, it is assured that, after a renewed start of the internal combustion engine, at first neither of the shift clutches is actuated.

The invention thus provides a hydraulic load power train control for reversible shifting with a pressure control device for controlled build-up of a shift clutch pressure, a foot clutch valve for arbitrary control of the shift clutches, and a manually operable shift valve for shifting of the reversible operation. The foot clutch valve is connected parallel to the pressure control device. The pressure control device is formed by a changeover valve that can be indirectly reversed by the shift valve and a changeover valve by which the pressure in the supply pressure line can be fed in a controlled way into two shift pressure lines connected to a valve device. The valve device at the same time is controlled by the foot clutch valve so that the effective shift clutch pressure can be controlled without influencing the position of the changeover valve as a function of the actuation of the foot clutch. The hydraulic load power train control, on the one hand, makes possible, in the case of engaging or reversing of the shift clutches, a smooth transition from one gear to another and, at the same time, a delay-free start in the shifting by actuation of the foot clutch.

What is claimed as new desired to be secured by Letters Patent of the United States is:

1. A hydraulic circuit for the control of forward and reverse shift clutches, said hydraulic circuit comprising:
   (a) a pressure control device for the controlled build-up of a shift clutch pressure, said shift clutch pressure being for use to actuate either a forward shift clutch or a reverse shift clutch;

(b) a foot clutch valve operatively connected to each of the shift clutches via a respective inverted shuttle valve; and
(c) a manually operable shift valve for clutch or said reverse clutch,
wherein:
(d) said foot clutch valve is connected in parallel to said pressure control device;
(e) said pressure control device comprises a changeover valve that has a neutral position, a position in which shift clutch pressure is connected to said forward shift clutch, and a position in which shift clutch pressure is connected to said reverse shift clutch and that can be shifted to any one of its positions by said manually operable shift valve via two shift control lines;
(f) said changeover valve feeds the pressure in a supply pressure line to one or the other or to both of two shift pressure lines, one of which leads to said forward shift clutch and one of which leads to said reverse shift clutch;
(g) each of said two shift pressure lines is connected to a respective one of said inverted shuttle valves, each one of said inverted shuttle valves being controlled by said foot clutch valve;
(h) a pressure reducing valve is connected upstream of said changeover valve; and
(i) each one of said inverted shuttle valves having two inputs and one output, a first input connection of each one of said pair of inverted shuttle valves being connected to a control line of said foot clutch valve, a second input connection of each one of said pair of inverted shuttle valves being connected to a respective one of said two shift pressure lines, and the output connection of one of said pair of inverted shuttle valves being connected to said forward shift clutch and the output connection of the other one of said pair of inverted shuttle valves being connected to said reverse shift clutch.

2. A hydraulic circuit according to claim 1 wherein said changeover vale is a three-way valve prestressed in a throttle interconnection position (B), said three-way valve comprising a piston slide having opposing control front surfaces which, in each case, are acted on by a feed back control line branching off from one of said shift pressure lines, said feed back control lines being in each case in fluidic communication by a shift control line with said manually operable shift valve for opening and closing, respectively, said shift control lines.

3. A hydraulic circuit according to claim 2 wherein a throttle is incorporated in each of said feed back control lines.

4. A hydraulic circuit according to claim 1 wherein said shift valve is a three-way valve prestressed in its center position (B), in which it discharges said shift control lines, said shift valve having a piston slide that can be manually moved into a shift position (A) in which one of said shift control lines is discharged and into a shift position (C) in which the other one of said shift control lines is discharged.

5. A hydraulic circuit according to claim 4 wherein said piston slide of said shift valve has two notched recesses, each one of which can be brought to engage a stop piston, with which said shift valve can be locked in its two shift positions (A and C).

6. A hydraulic circuit according to claim 5 wherein:
(a) said stop piston is received in a working cylinder;
(b) said stop piston limits a pressure chamber in said working cylinder; and
(c) said pressure chamber is connected to a hydraulic pressure circuit.

7. A hydraulic circuit according to claim 6 wherein said pressure chamber of said stop piston is connected to an oil hydraulic circuit.

8. A hydraulic circuit according to claim 4 wherein said shift control liens can be discharged into an oil hydraulic circuit.

9. A hydraulic circuit according to claim 1 wherein said foot clutch valve is a three-way valve, which in its Clutch engaged condition (A) connects said control line of said foot clutch valve with pressure ($p_1$) in said supply pressure line and in its clutch disengaged position (C) connects said control line of said foot clutch valve to a pressure discharge.

10. A hydraulic circuit according to claim 9 wherein the discharge of said control line of said foot clutch valve takes place in an oil hydraulic circuit.

11. A hydraulic circuit according to claim 10 wherein the pressure in said oil hydraulic circuit is less than 2 bars.

12. A hydraulic circuit according to claim 1 wherein said pressure reducing valve is sized, shaped, and positioned to reduce supply pressure ($p_1$) by about 3 bars.

13. A hydraulic circuit according to claim 12 wherein supply pressure ($p_1$) is about 15 bars.

* * * * *